(12) United States Patent
Stevens

(10) Patent No.: US 10,974,293 B2
(45) Date of Patent: Apr. 13, 2021

(54) DEVICE FOR PHYTO-ECOLOGICAL MONITORING

(71) Applicant: Kevin John Stevens, Waterloo (CA)

(72) Inventor: Kevin John Stevens, Waterloo (CA)

( * ) Notice: Subject to any disclaimer, the term of this patent is extended or adjusted under 35 U.S.C. 154(b) by 0 days.

(21) Appl. No.: 16/665,028

(22) Filed: Oct. 28, 2019

(65) Prior Publication Data

US 2020/0055103 A1 Feb. 20, 2020

Related U.S. Application Data

(62) Division of application No. 14/709,829, filed on May 12, 2015, now Pat. No. 10,603,700.

(60) Provisional application No. 61/992,207, filed on May 12, 2014.

(51) Int. Cl.
*B09C 1/00* (2006.01)
*G06Q 50/02* (2012.01)
*A01G 9/029* (2018.01)

(52) U.S. Cl.
CPC .............. *B09C 1/00* (2013.01); *A01G 9/0293* (2018.02); *G06Q 50/02* (2013.01); *B09C 2101/00* (2013.01)

(58) Field of Classification Search
CPC .............................. B09C 1/00; B09C 2101/00
See application file for complete search history.

(56) References Cited

U.S. PATENT DOCUMENTS

| | | | |
|---|---|---|---|
| 1,380,253 A | 5/1921 | Rodger | |
| 4,135,331 A | 1/1979 | Lamlee | |
| 5,016,548 A | 5/1991 | Ito | |
| 5,159,779 A | 11/1992 | Johnson | |
| 5,225,342 A | 7/1993 | Farrell | |
| 7,587,859 B2 | 9/2009 | Bradley | |
| 7,972,840 B2 | 7/2011 | Hasegawa | |
| 2004/0000090 A1 | 1/2004 | Miller | |
| 2011/0247269 A1* | 10/2011 | Cool | A01G 9/029 47/66.7 |
| 2012/0186152 A1 | 7/2012 | Huang | |

(Continued)

FOREIGN PATENT DOCUMENTS

WO 2013/124794 A1 8/2013

OTHER PUBLICATIONS

Giant Mine Remediation Project; Giant Mine Working Group MV2007L8-0031; Aug. 14, 2014 Meeting Summary, Oct. 8, 2014.

(Continued)

*Primary Examiner* — Christopher D Hutchens

(74) *Attorney, Agent, or Firm* — Brunet & Co., Ltd.; Hans Koenig; Robert Brunet

(57) ABSTRACT

A phytotoxicological device is provided comprising: a delivery chamber for insertion into a sample-containing medium, said delivery chamber comprising an upper end, a lower end and one or more apertures to permit moisture to enter the delivery chamber; an exposure chamber in communication with the upper end of the delivery chamber and adapted to receive a cartridge that houses a biological plant material; a locking cap to enclose the exposure chamber; and a base to enclose the lower end of the delivery chamber. This device allows for an investigation of the effects of waterborne contaminants on growth of wetland plants in situ as opposed to currently employed laboratory based methods.

20 Claims, 6 Drawing Sheets

(56) References Cited

U.S. PATENT DOCUMENTS

2014/0059929 A1* 3/2014 Stearn .................. A01G 9/0293 47/85
2020/0260657 A1* 8/2020 Latessa ................ A01G 9/0293

OTHER PUBLICATIONS

Proceedings of the 41st Annual Aquatic Toxicology Workshop: Sep. 28-Oct. 1, 2014, Ottawa, Ontario, C.J. Rickwood et al.—p. 125.
Office Action on U.S. Appl. No. 14/709,829 dated Oct. 4, 2017.
Office Action on U.S. Appl. No. 14/709,829 dated Mar. 2, 2018.
Office Action on U.S. Appl. No. 14/709,829 dated Jan. 10, 2019.
Office Action on U.S. Appl. No. 14/709,829 dated Jul. 10, 2019.

* cited by examiner

DEVICE FOR PHYTO-ECOLOGICAL MONITORING

FIELD OF THE INVENTION

The present invention relates to ecotoxicological monitoring of wetlands including areas such as swamps, marshes, lakes, rivers, oceans and, more particularly, to a simple device for growing plants and associated soil fungi in a vessel that isolates the plant from the soil but permits contact with soil/water solution. This approach allows for an investigation of the effects of waterborne contaminants on growth of wetland plants in situ as opposed to currently employed laboratory based methods.

BACKGROUND OF THE INVENTION

The aquatic phytotoxicity, or toxicity of waterborne contaminants on terrestrial and aquatic plants, is an important part of the environmental monitoring and land remediation programs. See for example "Handbook of Ecotoxicology", Second Edition, D. Hoffman et al (Eds), page 191. The common practice for quantification of the effects of waterborne contaminants on vegetation is conducting laboratory experiments under controlled greenhouse or laboratory conditions. During these assessments, water and/or soil is retrieved from a location of interest and transported to the controlled environment where seeds and/or seedlings are exposed to the water/soil and parameters including seed germination and seedling growth are assessed. Typically, these experiments contain a control treatment with non-contaminated soils/water, or have been repeated over time to allow for a determination of baseline conditions in the area. Comparisons between the control and exposed treatments allow for the establishment of thresholds and are used as an assessment of contaminant effects. The data is then recorded and used as a reference for future assessments. Once such thresholds are established, the concentration of contaminants in soil/water samples can then be determined using analytical chemistry procedures and compared to established guidelines to ascertain if a contaminant effect should be expected. See for example, "Biological Test Method: Test for Measuring Emergence and Growth of Terrestrial Plants Exposed to Contaminants in Soil", a 2005 publication by Environment Canada.

These approaches have a number of limitations that affect their usefulness in environmental monitoring and land remediation efforts. The above mentioned current approaches portray conditions present at one point in time (when the samples were collected) and cannot capture temporal variability in the abiotic factors that may influence plant growth. Common approaches are also bulky and require a significant amount of controlled laboratory space to host growing plants. They take a relatively long time to get conclusive results and therefore are not at all suitable for situations of environmental emergency. Current analytical techniques are not able to convey the bioavailability of a contaminant and therefore cannot accurately predict plant responses to exposure. Furthermore, the effects of contaminants on soil fungi, although crucial to plant ecosystem functioning, are not routinely included in contaminant analyses.

There has been, however, an effort at developing laboratory-based novel assays involving aquatic and plant fungi. For example, Twanabasu et al, Science of the Total Environment (2013, 447 pp. 450-457) provide an assay in which growth parameters of arbuscular mycorrhiza, soil dwelling fungi that form symbiotic associations with plants, correlates with the concentration of the contaminant, triclosan. However, this assay is designed for a laboratory-based, controlled environment and is not suitable for use in field assessments.

Seed germination used for education purposes can be carried out on a glass slide covered with a piece of filter paper for visualization of plant growth (see "Teaching Plant Anatomy" by R L Peterson, C A Peterson and L H Melville 2008). One or more of such glass slides is then placed into a standard coplin jar, partially filled with water. The water is wicked by the filter paper wetting the seed. This assay is used to visually observe the seed germination process in real time, and can be adapted to observe the effects of contaminants on the seed and fungal spore germination (see for example Stevens K J et al, 2009, Environmental Toxicology and Chemistry, 28 pp. 2598-2609). However, this assay is again developed to be used in a controlled laboratory environment, and cannot be deployed in the field without incurring a significant facility cost.

The company, Microbiotests, provides a seed germination test in which seeds are manually attached to a filter paper which is then attached to a plastic sheet and exposed to a water/soil sample to be tested. The length of roots after 3 days of exposure is used to judge the toxicity of the sample. While this test represents progress towards phytotoxicological monitoring, it cannot be used for real time monitoring of water/soil samples.

It would be advantageous to the field of environmental toxicology to provide a portable, field deployable, and economical system that could be used to access phytotoxicity under real field conditions.

SUMMARY OF THE INVENTION

Field-deployable phytotoxicological devices useful to conduct phyto- and fungal-toxicology assays have now been developed which may be used in a variety of field situations, including wet and moist soils, standing and flowing waters, and aqueous sediments.

Thus, in one aspect of the invention, a phytotoxicological device is provided comprising:

a delivery chamber filled with capillary bed of filler material for insertion into a sample-containing medium, said delivery chamber comprising an upper end, a lower end and one or more apertures to permit moisture to enter the delivery chamber;

an exposure chamber in communication with the upper end of the delivery chamber and adapted to receive a cartridge that houses a biological plant and/or fungal material;

an optional locking cap to enclose the exposure chamber; and a base to enclose the lower end of the delivery chamber.

This and other aspects of the invention will become apparent in the description that follows by reference to the drawings.

DETAILED DESCRIPTION OF THE INVENTION

Embodiments of the invention are illustrated by FIGS. 1-6, with further descriptive details provided below.

Figure 1:
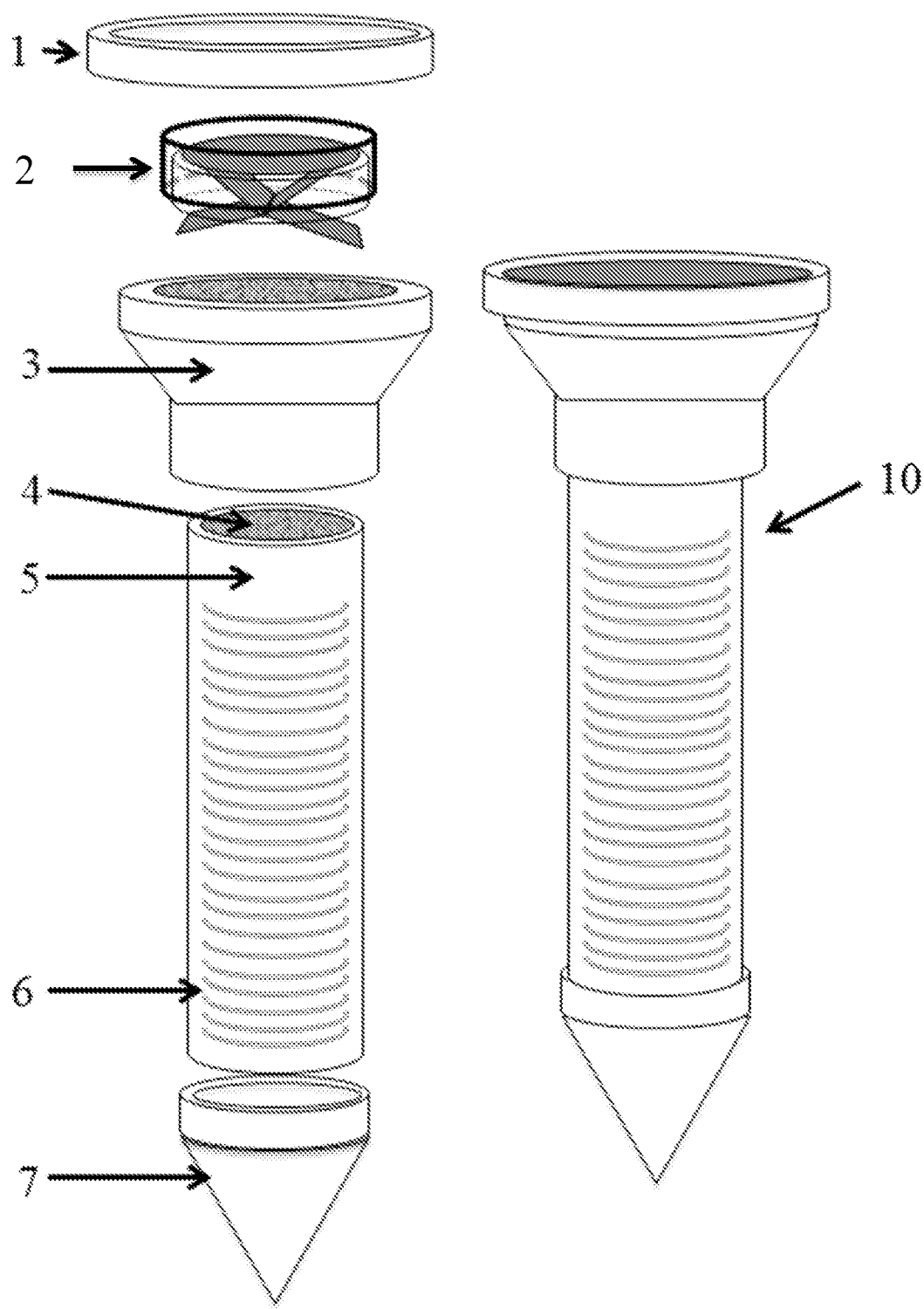
FIG. 1 is a schematic view of a phytotoxicological device in accordance with an embodiment of the invention suitable for use in the areas with moist soils.

FIG. 1 illustrates an embodiment of the phytotoxicological device 10 in accordance with the current invention, for use in moist soils. The device body may be made as a one piece from a suitable material, preferably plastic. In a preferred embodiment, the device is made of individual parts. On the left of FIG. 1 are shown the individual parts of the device in disassembled state, while on the right all parts are combined to represent the ready to use device.

The individual parts of the device may be made of any material suitable for use under the environmental conditions for which it will be used. Preferably, parts of the device are made of polyvinylchloride (PVC), or a like material, although alternative materials may be employed depending on the conditions to which the device will be exposed. In this regard, commercially available piping, similar to that used in constructing sewage systems, is appropriate for use in the device due to its properties of low corrosion, long lifetime, light weight, and easy processing. The parts of the device that connect may be manufactured so as to fit together snugly. However, for improved durability, it is preferred that connecting parts possess attachment means such as corresponding threads to permit connection that does not readily disengage over time.

As shown in FIG. 1, the device (10) comprises a delivery chamber (5) for insertion into a moisture-containing medium, such as a soil. The delivery chamber (5) comprises an upper end and a lower end and one or more apertures (6) to permit moisture to enter the delivery chamber. The lower end of the delivery chamber is capped by a base (7) to enclose and seal the lower end of the delivery chamber. The base (7) may assume a variety of shapes which may be dictated by the intended use of the device. For example, the base may be a conical shape to facilitate insertion of the device into the soil, while devices for use in water may include a flat or straight-edged base.

The delivery chamber generally assumes a tubular configuration which may preferably be cylindrical in cross-section, however, other cross-sections may also be used including square, pentagonal, octagonal, triangular, or the like. The delivery chamber will generally be a length sufficient to test a soil depth in which biological/plant materials are growing. Given that most wetland plants distribute their roots in the upper 30 cm of soil, the delivery chamber suitably ranges in size from about 5 to 35 cm.

In use, the delivery chamber (5) is filled with a capillary filler material (4) to facilitate absorption of moisture, or exposure solution, from the surrounding moisture-containing medium. Preferable capillary filler material (4) is a material that permits efficient movement of water by a wicking effect of capillary forces, for example, fine grained sand, silica-based granular media, glass beads or a porous material such as sponge. The granular material may include a range of particle sizes, e.g. 100-350 um, preferably 150 to 300 μm. The nature of the filler will impact delivery rates of the moisture within the device. A general filler material in the delivery cylinder may be utilized for routine monitoring, while a specialized filler material may be employed for specific assessments. The choice of filler material may substantially influence the rate and amount of exposure solution delivered to the test biological material and the rate at which changes in environmental conditions (concentration of compounds in the soil/water column) are experienced by the test subjects. For example, a finer grained filler material will offer greater capillary rise providing the capacity to deliver exposure water to test biological material in areas with greater magnitude of water level fluctuations. However, the greater tortuosity associated with finer grained filler material imparts a greater path length for solutes to diffuse along the height of the delivery chamber and, consequently, a greater time lag between a change in environmental conditions and a resultant change in solute concentrations experienced in the exposure chamber.

The placement and configuration of the apertures (6) within the delivery chamber (5) will vary with the intended use of the device, and the location in the soil from which the moisture is to be obtained. The apertures (6) may be a compact row of slits or holes at the same longitudinal distance along the chamber, or a series of slits or holes along the entire length of the delivery chamber. In an embodiment of the invention vertical slits along the delivery chamber are preferred, as shown on FIG. 1. For an embodiment when the device is used on standing water, series of holes at the bottom of the deliver chamber are preferable as shown on FIG. 2. The size of apertures (6) is chosen depending on the capillary filler material—smaller holes are needed if fine sized capillary filler is used to prevent the material from exiting the openings during regular device handling.

An exposure chamber (3) is connected to, and in communication with the upper end of the delivery chamber (5) and adapted to receive a cartridge (2) that houses/contains a biological plant material. The shape of the exposure chamber (3) will vary with the cartridge to be housed within the chamber (3) as will be discussed. An optional locking cap (1) fits onto the exposure chamber to enclose the cartridge therewithin, physically pressing and locking the cartridge (2). In an embodiment of the invention the cartridge (2) is made such a way that it could be locked while inserted and therefore the locking cap (1) may be not necessary. The exposure chamber (3) also contains the capillary filler material of the delivery chamber (5) such that the top surface of the capillary filler material is in direct contact with the bottom of the cartridge (2) housed within the exposure chamber (3) allowing water to move from the filler material (4) and into the cartridge (2).

Figure 2:
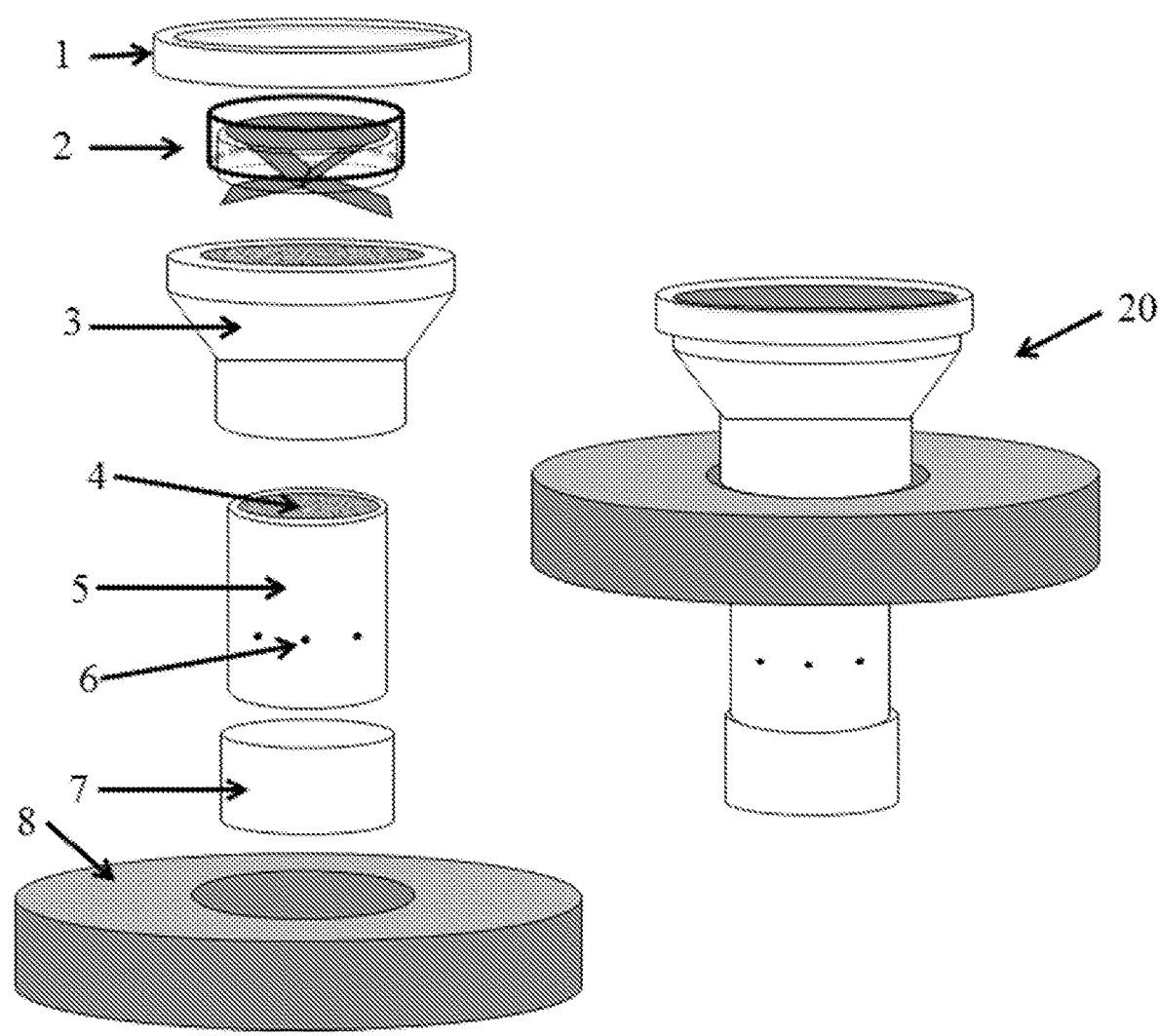
FIG. 2 is a schematic view of phytotoxicological device in accordance with another embodiment of the invention comprising a buoyant ring.

In another embodiment of the present invention, as depicted in FIG. 2, a phytotoxicological device (20) useful to conduct phytotoxicological assessment of freely standing waters, is shown. In this embodiment of the invention, the delivery chamber (5) is shorter in length than the device for use in soil as shown in FIG. 1 and preferably has a base (7) with a flat bottom. The device (20) is fitted with a float (8) in the form of a ring around the delivery chamber (5), or another part of the device, e.g. a ring around the exposure chamber (3). The float may also be positioned such as that water at a particular depth is sampled. The device may additionally include multiple floats. The float (8) is made of any buoyant material, for example a foam-like material, e.g. Styrofoam™, and has a diameter and thickness sufficient to provide stable buoyancy to the entire device, causing the device to stably float on the surface of water even under extreme environmental conditions. The float may be encased in a protective housing, e.g. a plastic or other waterproof housing, to maximize the life of the float.

In another embodiment, the device (20) may be fitted with a weight to submerge the device under the water to permit testing of deeper water. In this case, the weight will comprise a high-density material, e.g. lead, and may be in the form of a ring fitted onto the delivery chamber (5), or may be formed in another part of the device, e.g. within the exposure chamber (3) or base (7).

To maintain the positioning of the device (20) within a body of water, e.g. to prevent the device from floating away from its intended position, the device may be adapted for anchoring, e.g. may include means, such as a ring or clip, to attach the device to a tether that can be affixed to a nearby structure or an anchor.

Figure 3:
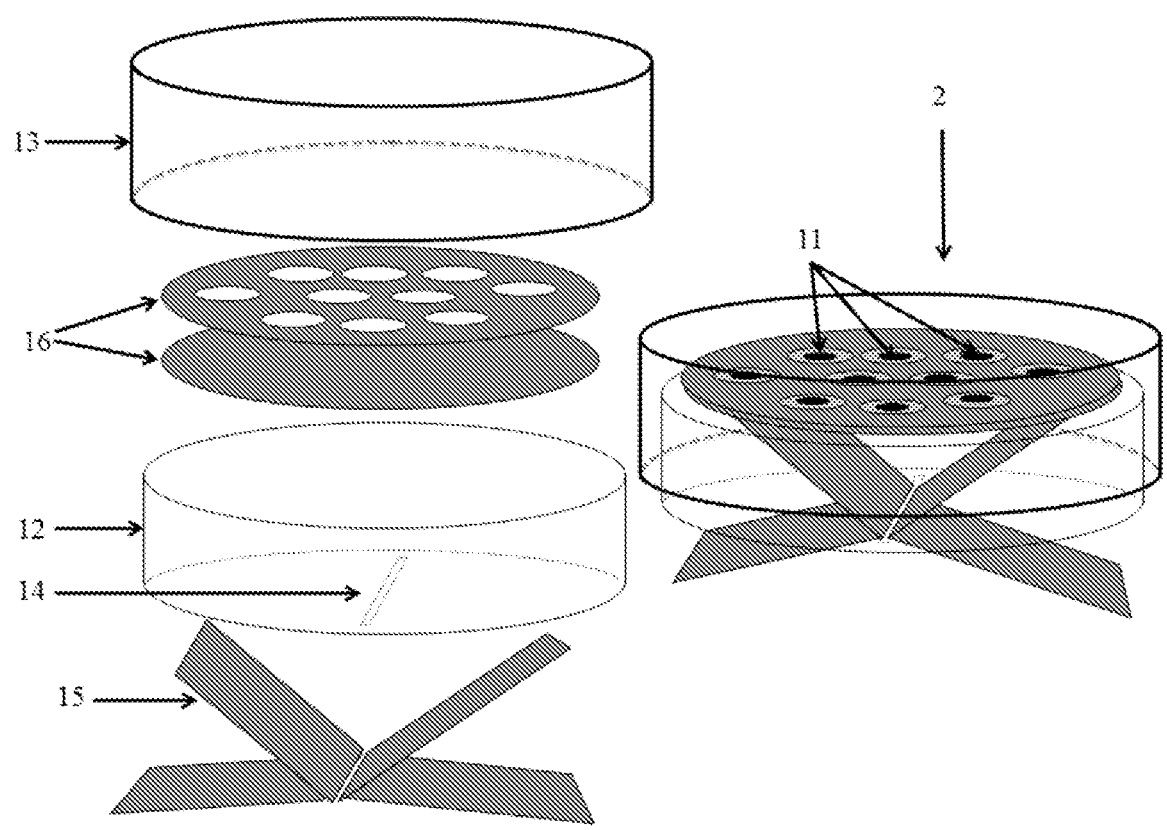
FIG. 3 is a schematic view of a seed germination cartridge for use with the phytotoxicological device as in FIG. 1 or 2.
Figure 4:
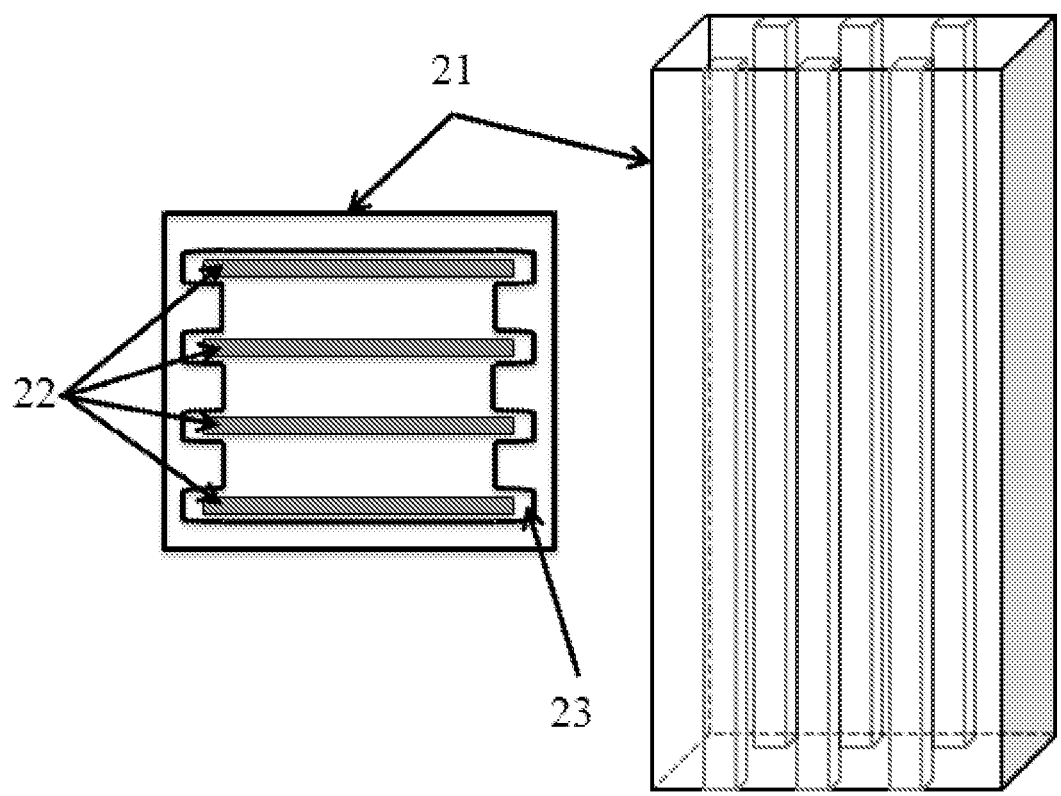
FIG. 4 is a schematic view of a slider cartridge carrying assay slides for use with a phytotoxicological device.
Figure 5:
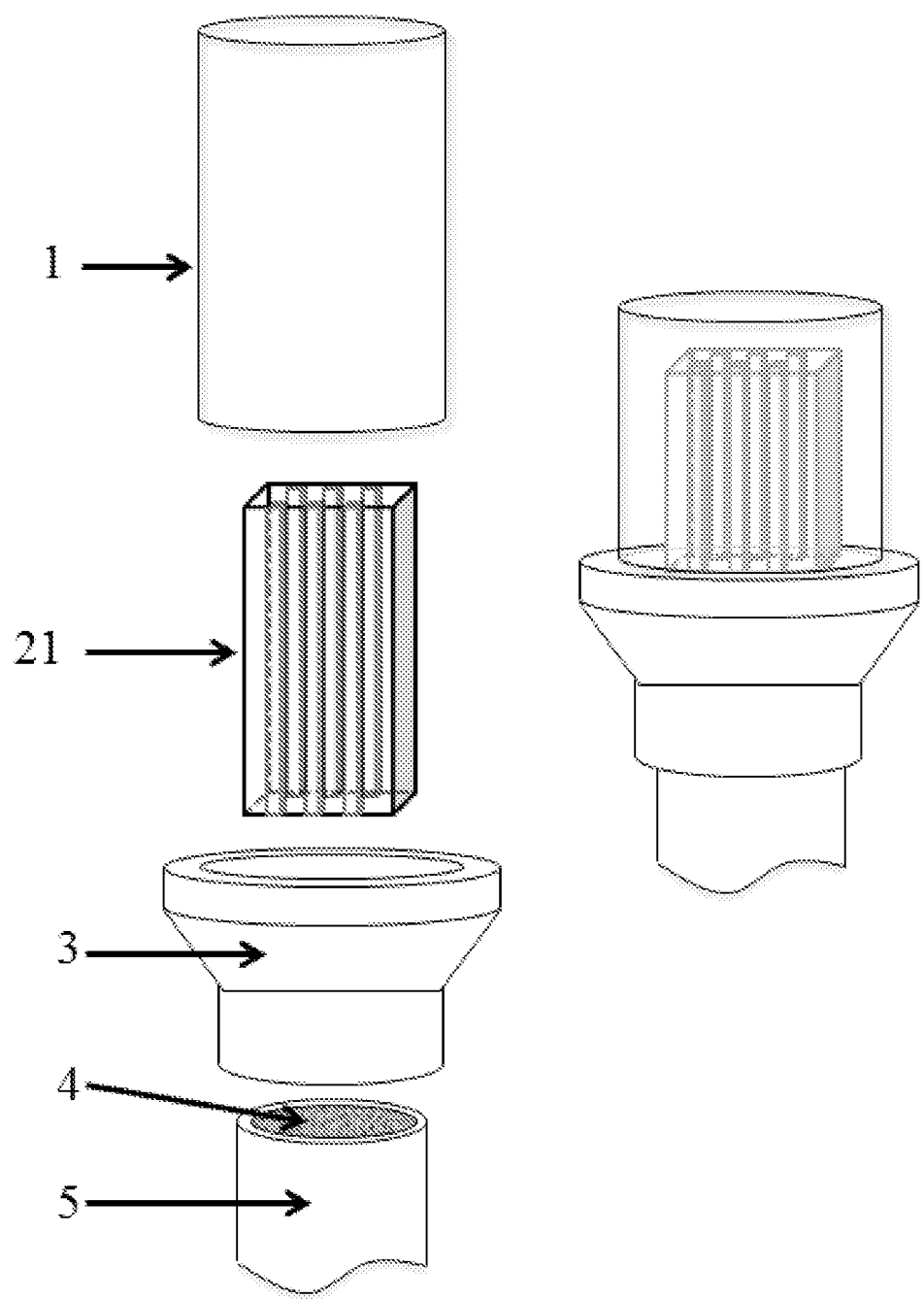
FIG. 5 is a schematic view of the phytotoxicological device in accordance with an embodiment of the invention modified to accommodate the slider cartridge.

A variety of cartridges may be utilized with the present phytotoxicological devices is shown in FIGS. 3-5. The cartridges are designed to be interchangeable for use in the present devices. For example, a first cartridge may be used in a phytotoxicological device, e.g. inserted into the exposure chamber (3) of the device, and once a selected assay is complete, the cartridge is removed and replaced with a similar or different cartridge.

In one embodiment, the cartridge is designed to monitor seed germination. Referring mainly to the FIG. 3, the cartridge (2) consists of a capped container having a base (12) and lid (13). This cartridge may be formed from a Petri dish, or like container. The base of the cartridge 12 has a narrow opening or slit (14) formed therein to permit entry of moisture from the delivery chamber (5, FIG. 1 or 2) via a moisture absorbing delivery means (15), e.g. wick or the like, which is in contact with the capillary filler material (4, FIG. 1 or 2) that carries moisture to the exposure chamber (3, FIG. 1 or 2) and which is in contact with the seed-containing medium (16). As shown in FIG. 3, the delivery means (15) may be folded pieces of blotter paper placed through the slit (14) and which lay on top of the capillary filler material (4, FIG. 1 or 2) to absorb moisture from the filler material. The seed-containing medium (16), which is also moisture absorbing, is placed on top of the delivery means (15). As illustrated in FIG. 3, the seed-containing medium (16) may be two pieces of blotter paper with holes formed in the top piece to accept the seeds. The seeds (11) may be glued to the blotter paper using non-toxic, biodegradable glue, e.g. based on starch. This will hold seeds in place during transport to the environmental monitoring site for deployment, and also during the testing period. The cartridge is covered by its lid (13) and placed into the phytotoxicological device according to FIG. 1 or 2.

Referring to FIG. 4, a slider cartridge (21) is designed to hold one or multiple standard laboratory glass slides (22) in a vertical position, held in place by grooves (23). In the preferred embodiment, the cartridge (21) is made of transparent plastic to allow the assay cartridge to be exposed to light. The bottom of the each groove has a stopper (not shown), to maintain the slides within the cartridge. The top part of the slider cartridge is completely open to allow easy removal of the slides (22).

Figure 6:
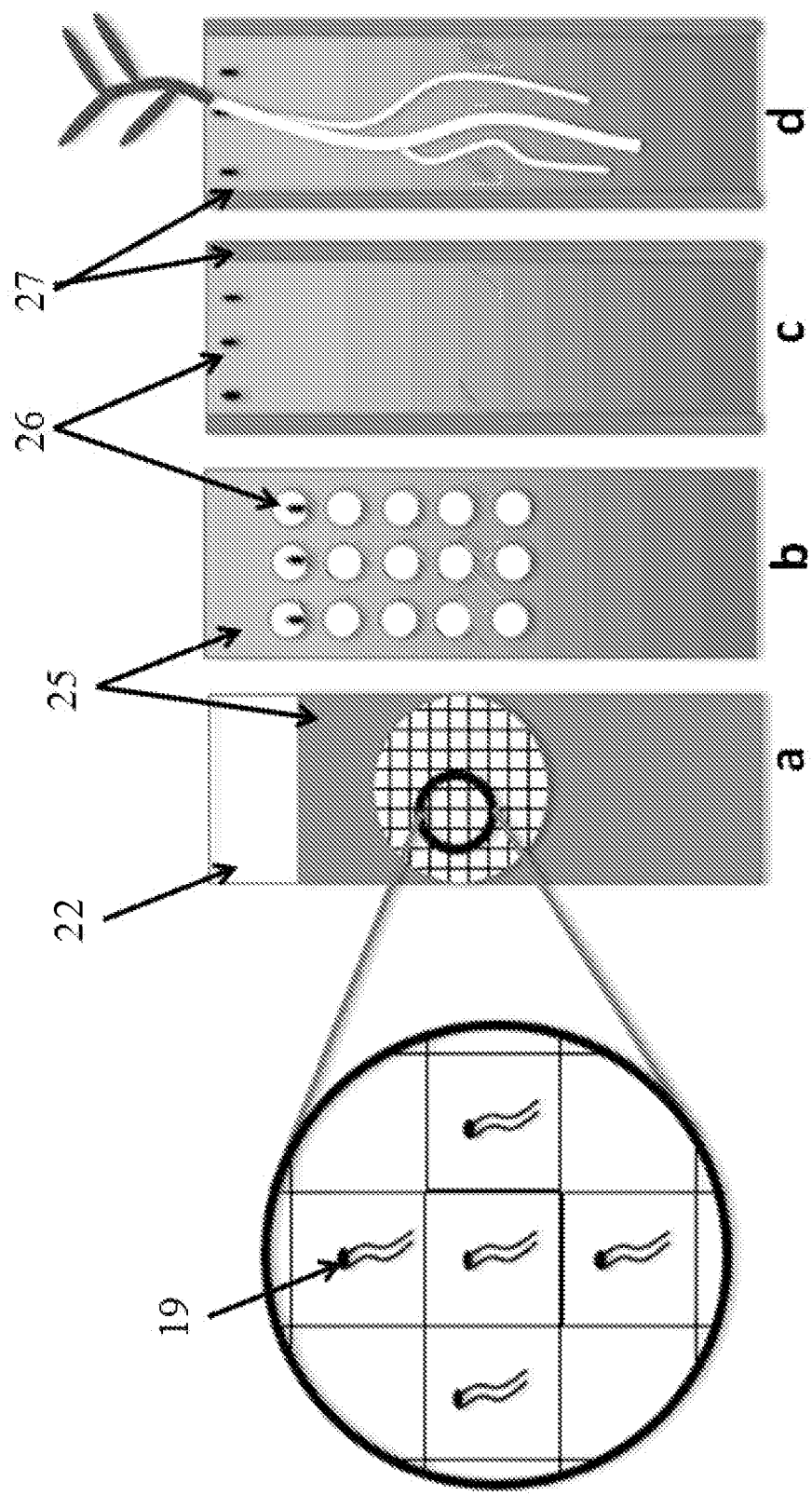
FIG. 6 is a schematic view of suitable slider assays for use with the slider cartridge as in FIG. 5 depicting hyphal growth, small seed germination, and seedling growth assays.

FIG. 5 demonstrates another embodiment of current invention designed specifically to accommodate the slider cartridge. Only top part of the phytotoxicological device is shown, while bottom part is identical to embodiments depicted in FIG. 1 or FIG. 2. When compared to the other embodiments depicted in FIGS. 1 and 2, the locking cap (1) is replaced with a cylindrical cap (1). When assembled (as shown in FIG. 5 on the right), the cap (1) covers the slider cartridge (21). The slider cartridge (21) is placed into the exposure chamber (3) such that the bottom of the glass slides (see FIG. 6) are in direct physical contact with capillary filler (4). The cylindrical cap (1) can be made of transparent or opaque material, depending on the requirements of the biological material utilized in the assays. For instance seeds and/or seedlings that require light for germination would be housed in an assembly with a transparent cylindrical cap while seeds that germinate in the dark would be housed in an assembly with an opaque cylindrical cap, FIG. 6 demonstrates three varieties of preferred glass slide assays: arbuscular mycorrhizal spore germination and growth assay (a), small seed germination assay (b), and seedling growth assay (c) and (d). The arbuscular mycorrhizal spore germination and growth assay (a) consists of a glass slide (22) with a strip of blotter paper (25) of the same width as the glass slide overlain upon it. A semi-circle of gridded, nitrocellulose filter paper is laid on top of the blooter paper. Fungal spores are then placed into one or more segments of the grid, and then covered with a cover slip (not shown). The entire assembly is then held together using non-toxic retainer rings, or alternatively glued together with a non-toxic glue. When the glass slide assay is placed into the slider cartridge (21, FIG. 5) and then into the device of current invention, and deployed in the field and exposed to moisture, the spores produce hyphae, which can be quantitatively observed using optical microscope. The degree of branching of hyphae can be used as outcome of the assay and correlated with contaminants present in the soil and/or water. The small seed germination assay (b) (FIG. 6) also contains a glass slide with two layers of fitted blotter paper strips (25): first layer of fitied blotter paper is the strip without holes, and a second blotter paper strip which has holes of about 2-3 mm in diameter as shown in FIG. 6. Plant seeds (26) are placed in one or more holes, and the assembly is then covered with a standard laboratory cover slip and held together by a non-toxic retaining ring or a glue. When the assay is exposed to moisture (e.g. by wicking moisture from the a capillary filler material (4) shown in FIG. 5), the seeds germinate. The germination could be observed either visually or by the means of magnifying glass. The number of seeds germinated is used as outcome of the assay and can be correlated with contaminants present in the soil. The seedling growth assay (c) and (d) (FIG. 6) also contains glass slide and fitted layer of blotter paper. The plant seeds (26) are placed near the upper edge of the slide onto blotter paper. Two additional stripes of blotter paper or a similarly sized spacer (27) are placed at side edges of the glass slides on top of the bottom sheet of the blotter paper. The entire assembly is then covered with cover slip and held in place with a non-toxic retaining ring or a glue. The blotter paper strips (27) provide spacing between the glass slide and cover slip. When exposed to moisture, the seeds germinate and develop into seedlings. The roots of the seedlings are observed either visually or by the means of magnifying glass. The length of the roots, root branching patterns, root hair length and density can then correlated with contaminants present in the soil. The description of the possible assays is not exhaustive and other assays could be developed for use with the phytotoxicological device.

Thus, the present devices may be used to conduct a variety of assays to determine the effect of a given environment, soil or water, on the growth of a biological material, such as plant material, e.g. seeds. Assays may include, but are not limited to, seed germination assays, plant root development assays, and fungal spore germination and growth assays. The assays are also useful to detect the presence and concentration of contaminants in a given environment. For example, by monitoring the effect on growth of a given environment on a given biological material, results obtained may be used to identify the presence of certain contaminants based on the known effect on the biological material. One or more devices may be installed for a period of time in the field in and around areas where water and soil contamination is suspected. After a given exposure period, the cartridges may be removed for analysis, and conclusions about potential toxic effects to the wetland ecosystem can be drawn.

The following field trials were conducted, which are not to be construed as limiting.

EXAMPLES

Example 1

To show that seed germination in the device as shown in FIG. 1 does not differ from germination obtained in standard petri dish based assay, germination in a device containing a silica-based filler material within the delivery chamber and a petri dish cartridge shown in FIG. 3 was compared to a single petri dish assay. Single petri based assays are conducted on a disk of moistened blotter paper placed in the bottom of a petri dish to which seeds are added. The lid is then placed on the petri dish and the sides sealed with a strip of water-proof film. Both treatments contained seeds of the wetland plant *Echinochloa crus-galli*. Seeds in both treatments were exposed to the same degree of water availability. After 12-days the number of seed germinating in both treatments was compared. In total 73.3±3.10% of seeds in the device and 75.5±3.17% of seeds in the petri dish assay germinated. There were no statistically significant differences in germination between treatments.

Example 2

To show that the germination in the device as shown in FIG. 1 is robust across a range of levels of standing water, germination in devices with varying heights of delivery chambers was compared. Eight devices with delivery chamber lengths ranging from 15-35 cms were constructed accordingly to FIG. 2, filled with a silica-based filler material, and a petri dish cartridges shown in FIG. 3 containing seeds of *Echinochloa crus-galli* were added. The devices were placed in beakers containing the same depth of standing water. After 16-days seed germination was assessed. Seed germination ranged from approximately 35 to 70% however there was no significant relationship between delivery chamber height and germination ($r^2=0.0032$).

Example 3

To show that seedling growth assay conducted vertically, as would be the case in a slider cartridge assembly (FIG. 4), provides comparable results to those obtained horizontally, as is found in conventional petri dish based assays, root growth in lettuce (*Lactuca sativa*) and reed canary grass (*Phalaris arundinacea*) was compared in the two orientations. For both species, total root length after five days was greater in the vertically grown seedlings indicating that root growth is enhanced in vertically grown plants.

Example 4

To show that seedling growth assay to assess arsenic toxicity conducted vertically, as would be the case in a slider cartridge assembly (FIG. 4), provides comparable results to those obtained horizontally, as is found in conventional petri dish based assays, root growth of lettuce (*Lactuca vulgaris*) was compared among orientations at concentrations of arsenic exposure in water ranging from 0 to 100 ppm. Assays conducted using vertically oriented seedlings were more sensitive to arsenic exposure than horizontally oriented seedlings and revealed a hermetic response (enhanced growth at low concentrations of a toxicant) not evident in horizontally grown seedlings.

Example 5

To show that a seed germination assay in a device as shown in FIG. 1 can be conducted in the field, numerous trials have been undertaken in wetlands and riverine areas in the Grand River Watershed, Waterloo, Ontario. To date we have conducted assays with barnyard grass (*Echinochloa crus-galli*), lettuce (*Lactucua sativa*) and reed canary grass (*Phalaris arundiacea*). All species utilized in our trials have germinated in the field indicating that the device is a viable means of assessing plant growth in wetland areas and that multiple species can be employed in these assessments.

What is claimed is:

1. A method of determining the effect of a given environment on a biological plant material, the method comprising:
    placing a phytotoxicological device in a moisture-containing site within the environment for a period of time, the phytotoxicological device comprising
        a delivery chamber for insertion into the moisture-containing site, the delivery chamber comprising an upper end, a lower end and one or more apertures to permit moisture to enter the delivery chamber,
        an exposure chamber in communication with the upper end of the delivery chamber, the exposure chamber containing a cartridge that houses the biological plant material,
        a capillary filler material in an interior of the delivery chamber to transfer moisture to the exposure chamber, and
        a base to enclose the lower end of the delivery chamber; and,
    removing the cartridge of the device and analyzing the effect of the environment on the biological plant material.

2. The method of claim 1, wherein the delivery chamber has a length in a range of from 5 cm to 35 cm.

3. The method of claim 1, wherein the cartridge is adapted to permit entry of moisture from within the delivery chamber.

4. The method of claim 3, wherein the cartridge comprises a slide holder and holds one or more substantially flat slides.

5. The method of claim 1, wherein the cartridge is constructed from a modified petri dish.

6. The method of claim 1, wherein the moisture-containing site comprises freely standing water, and the device further comprises a float.

7. The method of claim 6, wherein the device further comprises a weight to submerge the device in the water.

8. The method of claim 1, wherein the moisture-containing site comprises a sample-containing soil medium, and the base comprises a conical shape having a substantially pointed tip to facilitate insertion of the device into the sample-containing soil medium.

9. The method of claim 1, wherein the capillary filler material is selected from the group consisting of fine-grained sand, silica-based granular media, glass beads and sponge.

10. The method of claim 1, wherein device further comprises a locking cap that locks the cartridge in place within the exposure chamber.

11. A method of identifying a contaminant in a given environment, the method comprising:

placing a phytotoxicological device in a moisture-containing site within the environment for a period of time, the phytotoxicological device comprising a delivery chamber for insertion into the moisture-containing site, the delivery chamber comprising an upper end, a lower end and one or more apertures to permit moisture to enter the delivery chamber, an exposure chamber in communication with the upper end of the delivery chamber, the exposure chamber containing a cartridge that houses a biological plant material, a capillary filler material in an interior of the delivery chamber to transfer moisture to the exposure chamber, and a base to enclose the lower end of the delivery chamber;

removing the cartridge of the device and analyzing the effects of the environment on the biological material; and, comparing the effects on the biological material to controls to identify the presence of the contaminant.

12. The method of claim 11, wherein the delivery chamber has a length in a range of from 5 cm to 35 cm.

13. The method of claim 11, wherein the cartridge is adapted to permit entry of moisture from within the delivery chamber.

14. The method of claim 13, wherein the cartridge comprises a slide holder and holds one or more substantially flat slides.

15. The method of claim 11, wherein the cartridge is constructed from a modified petri dish.

16. The method of claim 11, wherein the moisture-containing site comprises freely standing water, and the device further comprises a float.

17. The method of claim 16, wherein the device further comprises a weight to submerge the device in the water.

18. The method of claim 11, wherein the moisture-containing site comprises a sample-containing soil medium, and the base comprises a conical shape having a substantially pointed tip to facilitate insertion of the device into the sample-containing soil medium.

19. The method of claim 11, wherein the capillary filler material is selected from the group consisting of fine-grained sand, silica-based granular media, glass beads and sponge.

20. The method of claim 11, wherein device further comprises a locking cap that locks the cartridge in place within the exposure chamber.

* * * * *